United States Patent
Fuchs et al.

(10) Patent No.: US 7,640,296 B2
(45) Date of Patent: Dec. 29, 2009

(54) MAPPING OF A CONTENT REQUEST FOR A CACHE SERVER

(75) Inventors: Harald Fuchs, Karlsruhe (DE);
Wolfgang Theilmann, Karlsruhe (DE);
Christian Merz, Waldkirch (DE);
Wolfgang Gerteis, Karlsruhe (DE);
Michael Altenhofen, Karlsruhe (DE)

(73) Assignee: SAP AG, Walldorf (DE)

( * ) Notice: Subject to any disclaimer, the term of this patent is extended or adjusted under 35 U.S.C. 154(b) by 769 days.

(21) Appl. No.: 11/019,607

(22) Filed: Dec. 21, 2004

(65) Prior Publication Data
US 2006/0167979 A1   Jul. 27, 2006

(51) Int. Cl.
*G06F 15/16* (2006.01)
*G06F 15/173* (2006.01)

(52) U.S. Cl. .................. 709/203; 709/217; 709/219; 709/226; 709/228

(58) Field of Classification Search ............. 709/203, 709/217, 219, 227, 228, 232, 238, 226
See application file for complete search history.

(56) References Cited

U.S. PATENT DOCUMENTS

| | | | |
|---|---|---|---|
| 6,351,767 B1 * | 2/2002 | Batchelder et al. | 709/219 |
| 6,785,769 B1 * | 8/2004 | Jacobs et al. | 709/232 |
| 6,789,170 B1 * | 9/2004 | Jacobs et al. | 709/227 |
| 7,103,714 B1 * | 9/2006 | Jacobs et al. | 709/228 |
| 7,269,633 B2 * | 9/2007 | Allan | 709/217 |
| 7,296,076 B1 * | 11/2007 | Portolani | 709/238 |
| 2001/0034814 A1 * | 10/2001 | Rosenzweig | 709/203 |
| 2004/0044731 A1 * | 3/2004 | Chen et al. | 709/203 |
| 2005/0027869 A1 * | 2/2005 | Johnson | 709/227 |

FOREIGN PATENT DOCUMENTS

WO    WO-0215531 A1    2/2002

OTHER PUBLICATIONS

Search Report for Application No. EP05027566 (Feb. 20, 2006).
Mogul, J. C., et al., "Design Implementation And Evaluation of Duplicate Transfer Detection In HTTP", *First Symposium On Networked Systems Design and Implementation (NSDI'04) Usenik Assoc Berkeley*, CA USA, http://www.usenix.org/events/nsdi04/tech/full_papers/mogul/mogul.pdf XP002364555, ISBN: 1-931971-19-6,(Mar. 29-31, 2004),43-56.

* cited by examiner

*Primary Examiner*—Quang N. Nguyen
(74) *Attorney, Agent, or Firm*—Schwegman, Lundberg & Woessner, P.A.

(57) ABSTRACT

An embodiment includes a method that includes receiving, into a cache server, from a client, a request for content from a content server. The request for content includes one or more fields. The method also includes mapping the request for content into a new request for content that is without the one or more fields. The method includes performing a lookup into a cache list of the cache server based on the new request for content.

29 Claims, 4 Drawing Sheets

MAPPING OF A CONTENT REQUEST FOR A CACHE SERVER

TECHNICAL FIELD

The application relates generally to data processing, and, more particularly, to processing of a content request in a cache server.

BACKGROUND

The amount of data traffic over large networks, such as the Internet, continues to increase. Such increase is the result of continued exponential increases in the number of users, as well as in the number of large documents, such as media files, to which these users desire access. As a result of this unprecedented demand in the need for bandwidth and access to networks, Internet Service Providers (ISPs), backbone providers, and other carriers that provide the physical connections which implement the Internet face correspondingly unprecedented difficulty.

The Internet provides widespread access to content on an equal basis through the use of a client and server communication model. In this structure, certain computers known as "servers" are used to store and provide information. One type of server, known as a host server, provides access to information such as data, text, documents, programs stored in various computer file formats, but generally referred to as a "document." Other computers in the network known as "clients" allow the users to view documents through the use of a computer program known as a browser that requests a copy of the document be sent from host servers down to the client. Documents are typically requested by the client browser program specifying an address which identifies the host server which stores the document. The request is sent over the network to a naming service in order to obtain instructions for how to establish a connection with the host server associated with the address. Once this connection is established, the server retrieves the document from its local disk and transmits the document over network to the client. The connection between the client and host server is then terminated. A given request may require that it pass through a number of routers or "hops" through the Internet on its way from the host server down to the client.

A common solution for the present bottlenecks within the Internet is to deploy higher speed interconnection hardware. Such solutions include the deployment of digital subscriber line (XDSL) and cable modem technology to speed up the access between the end users and points of presence. Gigabit speed routers and optical fiber backbones are also being proposed to alleviate congestion within the network itself. At the server site, server clusters and load balancers are being deployed to assist with the dispatching of Web pages more efficiently.

While all of these solutions provide some expediency, each only solves part of the problem, and none provides a satisfactory solution to the ultimate problem—the path between the client and server is only as fast or as slow as the slowest link.

As it turns out, much of the traffic on the Internet is redundant in the sense that different users request the same documents from the same servers over and over again. Therefore, it is becoming increasingly apparent that certain techniques, such as distributed content caching, may be deployed to reduce the demand for access to both the servers and to the network routing infrastructure. Distributing content throughout the network, such as through the use of document caches, provides a way to intercept client requests and serve copies of the original document to multiple client locations.

Using a cache, the process for providing document files to the client computers changes from the normal process. In particular, when the client requests the connection, say to a given server, the intermediate cache server may instead be requested to obtain the document. While the document is being transmitted down to the client computer, a copy is stored at the intermediate cache server. Therefore, when another client computer connected to the same network path requests the same content as the first user, rather than requiring the request to travel all the way back to the host server, the request may be served from the local cache server.

By moving popular content closer to the users who want such content, distributed content servers may be used to alleviate the congestion at its cause. These distributed cache servers dramatically improve end user response time, decrease backbone and server loading, provide a vehicle for efficient routing of time sensitive traffic.

This approach to caching may not prove useful for current content servers. In particular, current content servers often use more complicated Uniform Resource Locator (URL) schemes for specifying content access paths. Some servers map incoming URL requests to the URLs of the content that is finally delivered. For example, the access URL may contain a session key that is used for computing the final resource to be accessed. Such mapping poses severe problems on any content caching mechanism. Specifically, because of this mapping, the same access URL may lead to the delivery of different resources. In addition, different access URLs may result in the delivery of the same resource. Therefore, the primary access URL cannot be used by a cache server for identifying resources.

SUMMARY

Methods, apparatus and systems for mapping content requests for a cache server are described. Some embodiments include a method that includes receiving, into a cache server, from a client, a request for content from a content server. The request for content includes one or more of the attributes from a list that includes identification of the client, identification of a session between the client and the content server and identification of a user of the client. The method also includes mapping the request for content into a new request for content that is without the one or more attributes. The method includes performing a lookup into a cache list of the cache server based on the new request for content.

In some embodiments, a method includes receiving, from a client, a current request for content from a content server. The current request for content includes one or more of the attributes from a list that includes identification of the client, identification of a session between the client and the content server and identification of a user of the client. The method includes mapping the current request for content into a new request for content that is without the one or more attributes. The mapping of the current request is based on mapping of one or more previous requests. The method also includes performing a lookup into a cache list of the cache server based on the new request for content.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a system 100 can be located in FIG. 1. However, reference numbers are the same for those elements that are the same across different Figures. In the drawings.

DETAILED DESCRIPTION

Methods, apparatus and systems for mapping content requests for a cache server are described. In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
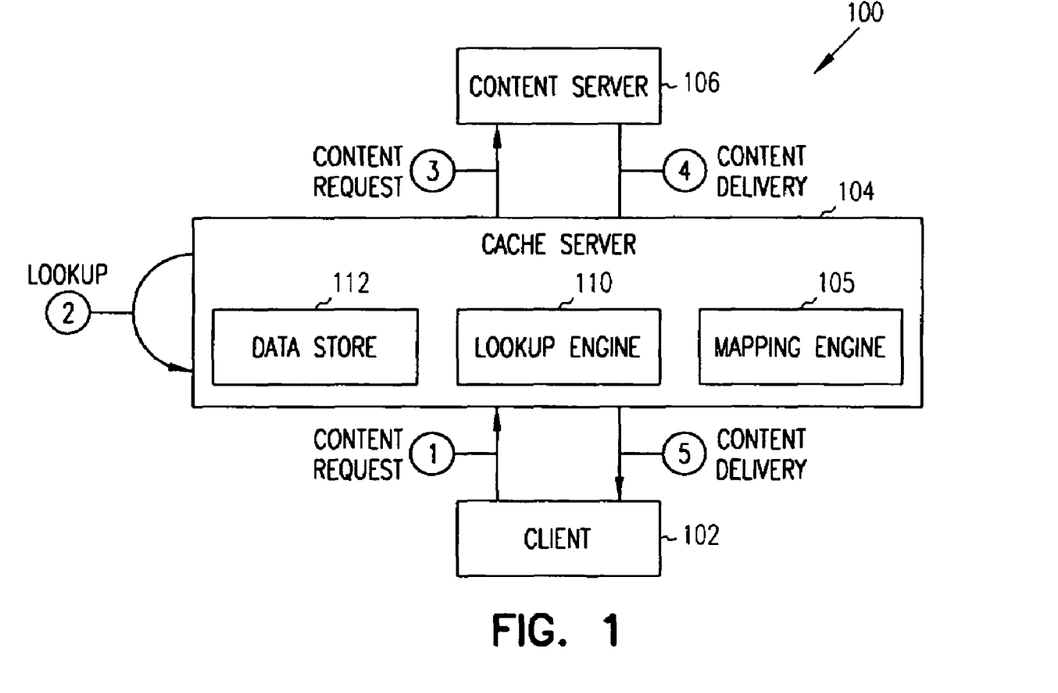
FIG. 1 is a dataflow diagram for mapping a content request for a cache server, according to some embodiments of the invention.
Figure 3:
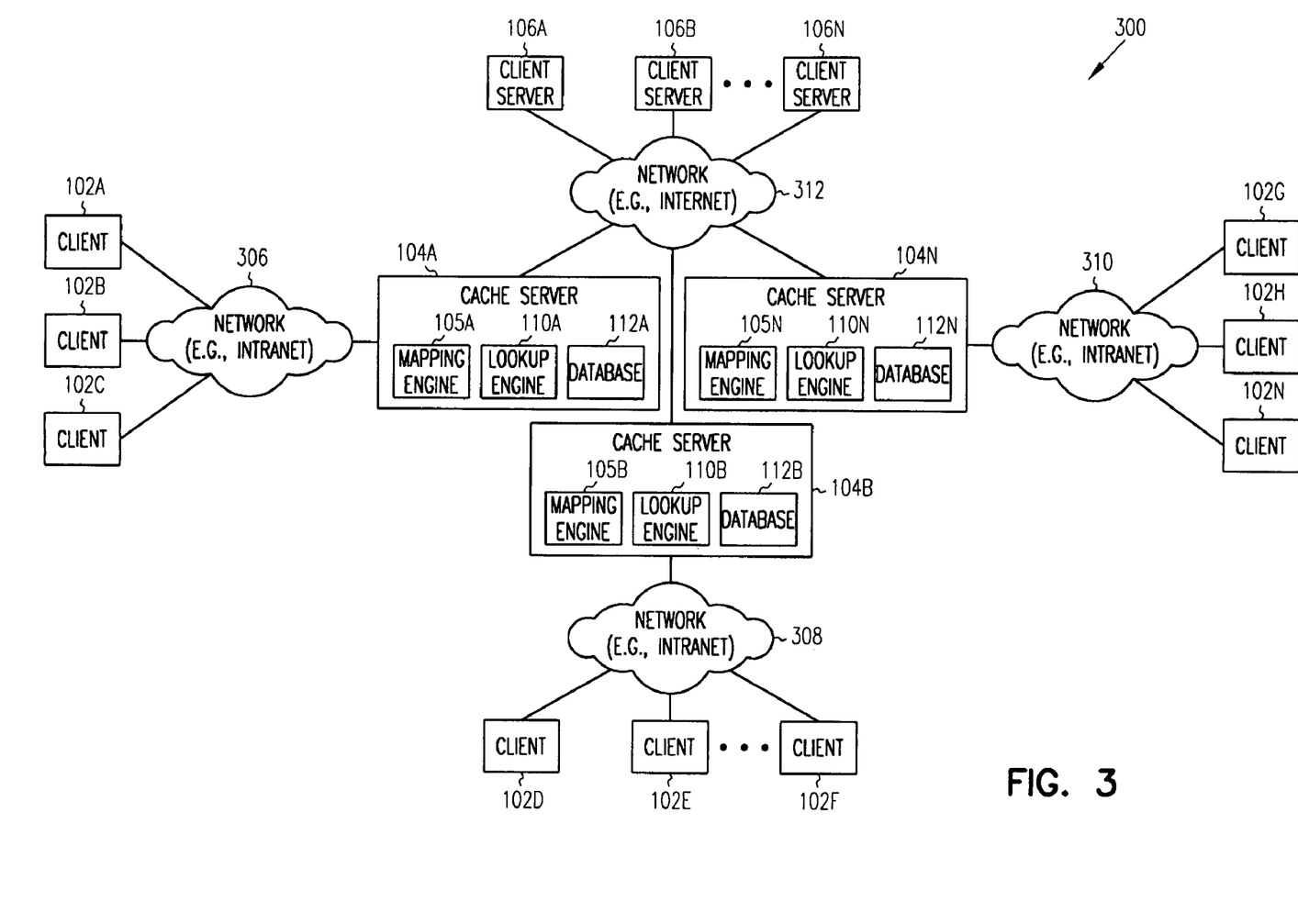
FIG. 3 illustrates a simplified block diagram of a system for mapping a content request for a cache server, according to some embodiments of the invention.

FIG. 1 is a dataflow diagram for mapping a content request for a cache server, according to some embodiments of the invention. FIG. 1 includes a system 100 that includes a client 102, a cache server 104 and a content server 106. The cache server 104 includes a mapping engine 105, a lookup engine 110 and a data store 112. The mapping engine 105 and the lookup engine 110 may be software, hardware, firmware or a combination thereof. The data store 112 may be different types of machine-readable medium. For example, the data store 112 may be volatile and/or non-volatile media (e.g., read only memory (ROM), random access memory (RAM), magnetic disk storage media, optical storage media, flash memory devices, etc.). The data store 112 may store copies of content retrieved from the content server 106 that is requested by the client 102. The data store 112 may also include a cache table having entries associated with the content stored therein. The system 100 is illustrated by a simplified block diagram. A more detailed block diagram of a system, according to some embodiments, is illustrated in FIG. 3 (which is described in more detail below).

At stage 1, the client 102 may transmit a content request for content stored on the content server 106. The content may include different types of data, such as text files, audio files, video files, etc. In some embodiments, the content request is in the form of a URL request. The content request may be received by the cache server 104. At stage 2, the mapping engine 105 may map the content request into a different format to generate a new content request. For example, in some embodiments, the mapping engine 105 may receive a URL request that includes fields/attributes that are specific to the user of the client 102, specific to the session between the client 102 and the content server 106, etc. The mapping engine 105 may generate a new content request. The new content request may be independent these fields/attributes. For example, the new content request may be without identifications of the user, the session, the client, etc.

In some embodiments, the mapping engine 105 may map from the received content request to the new content request based on a set of rules stored within the data store 112. The set of rules may be formulated based on a range of languages. For example, the set of rules may be based on a script language, a programming language, etc.

One example of a rule for a script language may as a follows:

"*userid*" -> "*username*"

This rule would replace the occurrences of the string "userid" by the string "usename".

A number of examples of a mapping operation are now described. In a first example, the identification of the session is replaced as part of the generation of the new request. In a second example, the identification of the client is replaced as part of the generation of the new request. In a third example, a version of a given file is appended as part of the new request.

For the first example, item (1) is a content request received (URL-formatted) from the client 102:

http://content.server:8000/session=88/next.html     (1)

Item (2) is a new content request generated by the mapping engine 105 based on the content request shown in item (1) after a first call within a given session:

http://content.server:8000/step1.html     (2)

As shown, the session identification ("session=88") has been removed and the term "next.html" is replaced with the term "step1.html". Item (3) is a new content request generated by the mapping engine 105 based on the content request shown in item (1) after a fifth call within the given session:

http://content.server:8000/step5.html     (3)

Therefore, as shown, the mapping engine 105 may generate a new content request that is not specific to a given session, but which considers the history of content requests within a given session. For the second example, item (4) is a content request received (URL-formatted) from the client 102:

http://content.server:8000/client=753/intro.html     (4)

Item (5) is a new content request generated by the mapping engine 105 based on the content request shown in item (4):

http://content.server:8000/users/europe/germany/
meier/intro.html     (5)

As shown, the client identification (client=753) is replaced by the address of the content.

For the third example, item (6) is a content request received (URL-formatted) from the client 102:

http://content.server:8000/lms/media/(c2lkPUE1
OUJCMzQ4OTh
BMTc2NDRCQTIwMDA1OTc4RjU0MzVGJnV1aWQ9NGZhMTlkOTRkMzUyM
DgzNCZuaWQ9NTM3NDIzNg==)/foo1/bar2/
baz3/x.html     (6)

This URL request does not include a version of the content being requested. Rather, the version of the content may be derived from the part of the URL request in parenthesis, which is a 64-based encoded string. The encoded string comprises the following three identifications:

sid=A59BB34898A17644BA20005978F5435F     (7)

uuid=4fa19d94d3520834     (8)

nid=5374236     (9)

In the current example, the "sid" and "nid" identifications are used by the content server 106 if the request is transmitted thereto. The "uuid" identification along with the remaining part of the URL request may be used to generate the new request (that includes the version of the content).

Figure 2:
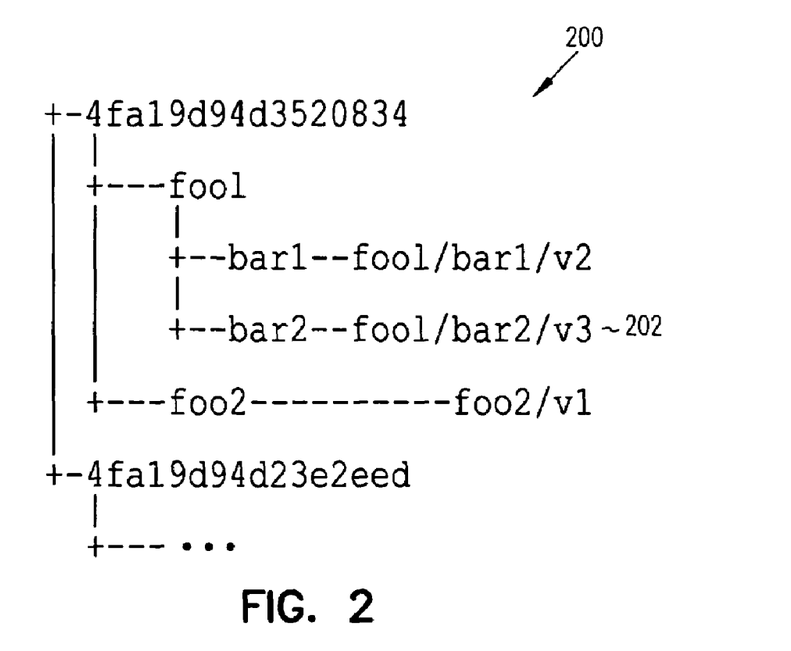
FIG. 2 includes an example data structure used to map a content request for a cache server, according to some embodiments of the invention.

To illustrate, FIG. 2 includes an example data structure used to map a content request for a cache server, according to some embodiments of the invention. FIG. 2 illustrates a data structure 200. The data structure 200 may be loaded from the content server 106 into the data store 112 of the cache server 104. The mapping engine 105 may traverses the data structure 200 to locate a leaf therein that matches a remaining part of the URL request ("/foo1/bar2/baz3/x.html"). This remaining part matches a leaf 202 in the data structure 200. Based on this match, the mapping engine 105 may generate the new request.

In this example, the new URL request is comprised of three parts: (1) a constant prefix, pointing at the storage location in the data store 112 where the replicated content is stored ("http://content.server:8000/courses/"); (2) the value of the leaf 202 ("foo1/bar2/v3/"; and (3) the remaining part of the original URL request ("baz3/x.html"):

$$\text{http://content.server:8000/courses/foo1/bar2/v3/baz3/x.html} \quad (10)$$

New content requests may be generated that are the same for multiple sessions and/or for different clients 102. Accordingly, using the new content requests, the lookups into the database 112 may not be specific to a particular client, session, etc. Therefore, a same cache entry in the database 112 may be accessed for multiple sessions and for multiple clients.

In some embodiments, the set of rules may be stored in the content server 106. The content server 106 may then distribute the set of rules as cacheable content to the cache server 104. In some embodiments, the mapping engine 105 may map the received request based on a history of requests from the client 102 or a user of the client 102, for the session between the client 102 and the content server 106, etc. A more detailed description of this operation is set forth below. Using the new content request, the lookup engine 110 may perform a lookup into the cache table in the data store 112 to determine whether the content is stored within the data store 112 in the cache server 104.

At stage 3, if the content is not stored in the cache server 104, the cache server 104 may transmit the new content request to the content server 106. The content server 106 may retrieve the content from a data store therein (not shown) based on the new content request (generated by the mapping engine 105).

At stage 4, the content server 106 may transmit the requested content back to the cache server 104. The cache server 104 may store the requested content into the data store 112. The cache server 104 may also add an entry to the cache table associated with the new content.

At stage 5, the cache server 104 may transmit the requested content to the client 102. Accordingly, the cache server 104 may transmit content previously stored locally therein or content received from the content server 106.

FIG. 3 is a block diagram of a system for mapping a content request for a cache server, according to some embodiments of the invention. As shown in FIG. 3, a system 300 includes multiple clients 102A-102N that may be coupled to multiple cache servers 104A-104N through networks 306-310. The system 300 also includes the multiple cache servers 104A-104N being coupled to multiple content servers 106A-106N through a network 312. The networks 306-213 may include a Local Area Network (LAN), a Wide Area Network (WAN), a telephone network, such as the Public Switched Telephone Network (PSTN), an intranet, the Internet, or a combination of networks. Although FIG. 3 illustrates a set number of clients 102, cache servers 104, content servers 106 and networks 306-312, the system 300 may include a lesser or greater number of such components. Also, in some instances, a client 102 may perform the functions of a server 104/106, and a server 104/106 may perform the functions of a client 102.

In some embodiments, the networks 306-310 may be intranets (such as LANs). For example, the networks 306-310 may be part of corporate LANs which provide a gateway to the network 312, which may be a WAN (e.g., the Internet). The clients 102A-102C are coupled to the network 306. The network 306 is also coupled to the cache server 104A that is coupled to the network 312. The clients 102D-102F are coupled to the network 308. The network 308 is also coupled to the cache server 104B that is coupled to the network 312. The clients 102G-102N are coupled to the network 310. The network 310 is also coupled to the cache server 104N that is coupled to the network 312. The network 312 is also coupled to the content servers 106A-106N.

The cache server 104A includes the mapping engine 105A, the lookup engine 110A and the database 112A. The cache server 104B includes the mapping engine 105B, the lookup engine 110B and the database 112B. The cache server 104N includes the mapping engine 105N, the lookup engine 110N and the database 112N. In some embodiments, a set of rules used by a mapping engine 105 may be unique to a content server 106. Accordingly, there may be a set of rules for each of the different content servers 106.

Embodiments of the invention may operate in systems with alternative configurations. For example, such a system may include multiple levels of cache servers 104 prior to retrieval of the content from the content servers 106.

Figure 4:
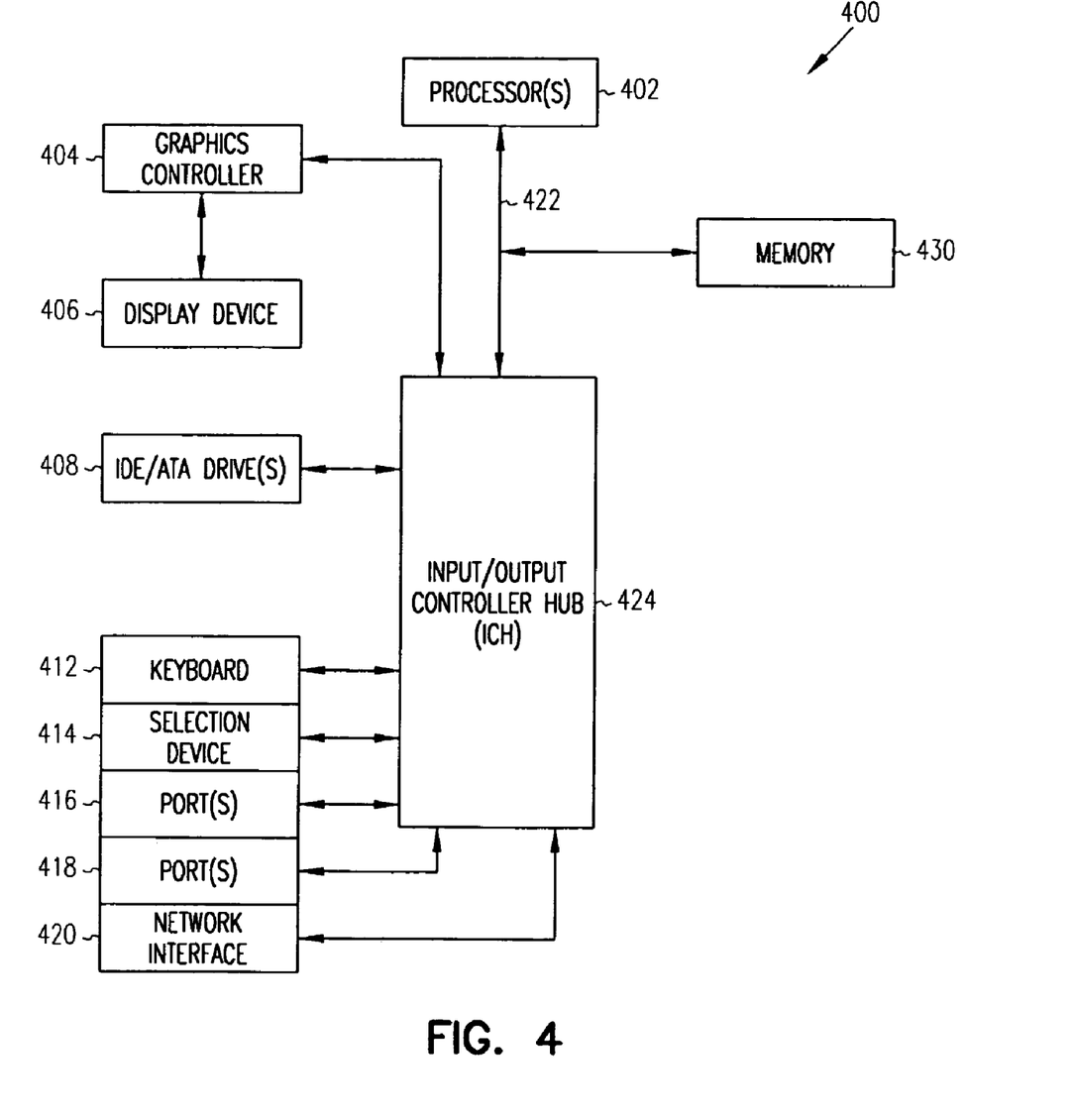
FIG. 4 illustrates a computer device that executes software for performing operations related to mapping of content requests, according to some embodiments of the invention.

An embodiment wherein software performs operations related to mapping of content requests as described herein is now described. In particular, FIG. 4 illustrates a computer device that executes software for performing operations related to acquiring user data over a network, according to some embodiments of the invention. FIG. 4 illustrates a computer device 400 that may be representative of at least part of the configuration of the client servers 106A-106N, the cache servers 104A-104N and/or the user devices 102A-102N.

As illustrated in FIG. 4, a computer device 400 comprises processor(s) 402. The computer device 400 also includes a memory 430, a processor bus 422, and an input/output controller hub (ICH) 424. The processor(s) 402, the memory 430, and the ICH 442 are coupled to the processor bus 422. The processor(s) 402 may comprise any suitable processor architecture. The computer device 400 may comprise one, two, three, or more processors, any of which may execute a set of instructions in accordance with some embodiments of the invention.

The memory 430 stores data and/or instructions, and may comprise any suitable memory, such as a random access memory (RAM). For example, the memory 430 may be a Static RAM (SRAM), a Synchronous Dynamic RAM (SDRAM), DRAM, a double data rate (DDR) Synchronous Dynamic RAM (SDRAM), etc. A graphics controller 404 controls the display of information on a display device 406, according to an embodiment of the invention.

The ICH 424 provides an interface to Input/Output (I/O) devices or peripheral components for the computer device 400. The ICH 424 may comprise any suitable interface controller to provide for any suitable communication link to the processor(s) 402, the memory 430 and/or to any suitable device or component in communication with the ICH 424. For an embodiment of the invention, the ICH 424 provides suitable arbitration and buffering for each interface.

In an embodiment, the ICH 424 provides an interface to one or more suitable Integrated Drive Electronics (IDE)/Advanced Technology Attachment (ATA) drive(s) 408, such as a hard disk drive (HDD). In an embodiment, the ICH 424 also provides an interface to a keyboard 412, a mouse 414, one or more suitable devices through ports 416-418 (such as parallel ports, serial ports, Universal Serial Bus (USB), Firewire ports, etc.). In some embodiments, the ICH 424 also provides a network interface 420 though which the computer device 400 may communicate with other computers and/or devices.

With reference to the cache server 104, the memory 430 and/or one of the IDE/ATA drives 408 may store the data store 112. In some embodiments, the lookup engine 110 and the mapping engine 104 may be instructions executing within the processor(s) 402. Therefore, the lookup engine 110 and the mapping engine 104 may be stored in a machine-readable medium that are a set of instructions (e.g., software) embodying any one, or all, of the methodologies described herein. For example, the lookup engine 110 and the mapping engine 104 may reside, completely or at least partially, within the memory 430, the processor(s) 402, one of the IDE/ATA drive (s) 408, etc.

This section provides a description of operations related to mapping content requests for a cache server, according to some embodiments of the invention. In some embodiments, the operations may be performed by instructions residing on machine-readable media (e.g., software), by hardware, firmware, or a combination thereof.

Figure 5:
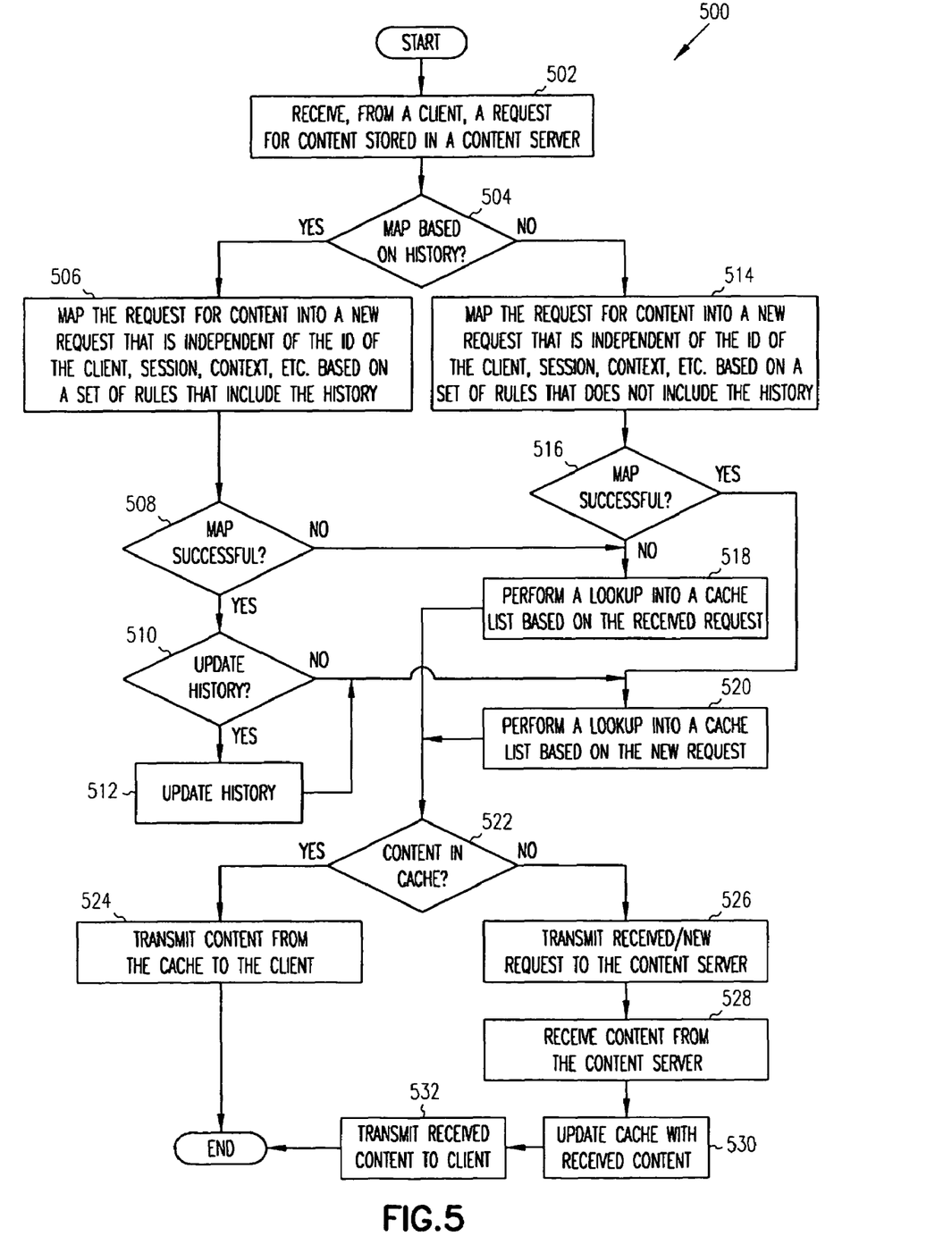
FIG. 5 illustrates a flow diagram of operations for mapping content requests for a cache server, according to some embodiments of the invention.

FIG. 5 illustrates a flow diagram of operations for mapping content requests for a cache server, according to some embodiments of the invention. The flow diagram 500 is described with reference to the system 100 in FIG. 1. The flow diagram 500 commences at block 502.

At block 502, the mapping engine 105 receives a request, from the client 102, for content stored in the content server 106. The content may be text files, different types of media files, etc. The flow continues at block 504.

At block 504, the mapping engine 105 determines whether a mapping operation is based on history of the client and/or session between the client and the content server. This determination may be a configurable parameter that is part of the set of rules used by the mapping engine 105. In particular, if the history is used, the mapping engine 105 reviews the previous request(s) from the client and mapping thereof to perform the current mapping operation. For example, a first request in a session may have certain fields (such as a version of a file) that are not in the subsequent requests. Accordingly, the mapping engine 105 may use the version of the file from the previous request for mapping of the current request.

At block 506, upon determining that the mapping is based on a history, the mapping engine 105 maps the request for content into a new request that may be independent of various fields/attributes that are specific to the client, session, user, etc. based on a set of rules that includes the history. Such fields/attributes may include identification of the client, identification of the session between the client and the content server, the context of the session, etc. In other words, the mapping engine 105 may generate a new request that is generic (not specific to a client or user thereof). The flow continues at block 508.

At block 508, the mapping engine 105 determines whether the mapping operation is successful. In some embodiments, only a part of the mapping logic may be stored in the cache server 104. The other part of the mapping logic may be stored at the content server 106. For example, the language used to express the rules may not allow for given mapping rules to be expressed. Therefore, the mapping engine 105 may not be able to perform certain mapping operations. Upon determining that the map operation was not successful, the flow continues at block 518, which is described in more detail below.

At block 510, upon determining that the map operation was successful, the mapping engine 105 determines whether the history of requests should be updated. For example, the history of requests may need to be updated if a new session is established in order to determine the new session identification, client identification, etc. Conversely, if the current request is part of a current session, the history of requests may not need to be updated. Upon determining that the history should not be updated, the flow continues at block 520, which is described in more detail below.

At block 512, upon determining that the history should be updated, the mapping engine 105 performs this update. The history may be stored within the data store 112. The history may include the received requests and the requests in to which the received requests were mapped. Alternatively or in addition, the history may include different fields being updated (such as the session identification, client identification, etc.).

At block 514, upon determining that the mapping is not based on a history, the mapping engine 105 maps the request for content into a new request that may be independent of identification of the client, identification of the session between the client and the content server, the context of the session, etc. based on a set of rules that does not include the history. In particular, the mapping engine 105 performs such mapping independent of the mapping of previous requests. The flow continues at block 516.

At block 516, the mapping engine 105 determines whether the mapping operation is successful. As described above at block 508, the mapping engine 105 may not be able to perform certain mapping operations. Upon determining that the map operation was not successful, the flow continues at block 518.

At block 518, upon determining that the map operation was not successful, the lookup engine 110 performs a lookup into the cache list based on the received request. The results of the attempted map operations are not used. Rather the lookup engine 110 performs a lookup into the cache list based on the original content request. The flow continues at block 522, which is described in more detail below.

At block 520, upon determining that the map operation was successful, the lookup engine 110 performs a lookup into the cache list based on the new request. The flow continues at block 522.

At block 522, the lookup engine 110 determines whether the content is in the cache based on the lookup into the cache list. Upon determining that the content is not in the cache, the flow continues at block 526, which is described in more detail below.

At block 524, upon determining the content is in the cache, the lookup engine 110 transmits the content retrieved from the cache from the data store 112 to the client 102. The operations of the flow diagram 500 are complete.

At block 526, upon determining the content is not in the cache, the lookup engine 110 transmits the request (either the received one or the new one) to the content server 106. In particular, if the mapping operation was successful, the lookup engine 110 transmits the new request. Otherwise, the lookup engine 110 transmits the received request. The flow continues at block 528.

At block 528, the lookup engine 110 receives the content back from the content server 106. The flow continues at block 530.

At block 530, the lookup engine 110 updates the cache in the data store 112 with the received content. The lookup engine 110 also updates the cache list to reflect the storage of the received content therein. The flow continues at block 532.

At block 532, the lookup engine 110 transmits the content received from the content server 106 to the client 102. The operations of the flow diagram 500 are complete.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for mapping content requests for a cache server, in accordance with some embodiments of the invention. A flow diagram illustrates the operations for mapping content requests for a cache server, in accordance with some embodiments of the invention. The operations of the flow diagram will be described with references to the systems/apparatus shown in the block diagrams. However, it should be understood that the operations of the flow diagram could be performed by embodiments of systems and apparatus other than those discussed with reference to the block diagrams, and embodiments discussed with reference to the systems/apparatus could perform operations different than those discussed with reference to the flow diagram.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A method including:
   receiving, into a cache server, from a client, a request for content from a content server, wherein the request for content includes one or more fields;
   mapping the request for the content into a new request for the content that is without the one or more fields, wherein the mapping of the request includes:
      deriving a field from a history of requests, wherein the history of requests include at least one previous request for the same content, and
      inserting the field into the request; and
   performing a lookup into a cache list of the cache server based on the new request for the content;
   wherein deriving a field from a history of requests includes:
      removing one or more fields from the request for content if the field contains identification of the client, identification of a session between the client and the content server, or identification of a user of the client;
      decoding an encoded string included as one of the one or more fields included in the request; and
      creating the field based on at least a portion of the decoded string.

2. The method of claim 1, further including retrieving the content from a machine-readable medium in the cache server if the content is stored in the machine-readable medium in the cache server based on the new request for the content.

3. The method of claim 2, further including forwarding the content to the client if the content is stored in the machine-readable medium in the cache server based on the new request for content.

4. The method of claim 2, further including: performing the following operations if the content is not stored in the machine-readable medium in the cache server:
   forwarding the new request for the content to the content server;
   receiving the content from the content server;
   storing a copy of the content in the machine-readable medium in the cache server; and
   forwarding the content to the client.

5. The method of claim 1, wherein receiving the content request includes receiving a Uniform Resource Identifier (URI) request for content.

6. The method of claim 1, wherein the one or more fields include attributes from a list that includes identification of the client, identification of a session between the client and the content server and identification of a user of the client.

7. The method of claim 1, wherein deriving a field from a history of requests includes:

removing one or more fields from the request for content that contain identification of the client, identification of a session between the client and the content server, or identification of a user of the client;

determining the number of previous requests for the content received during a current session between the client and the content server; and creating the field based on the number of previous requests for the content.

8. The method of claim 1, wherein deriving a field from a history of requests includes:

removing one or more fields from the request for content that contain identification of the client, identification of a session between the client and the content server, or identification of a user of the client;

determining the address within the content server of the requested content based on the removed field; and creating the field based on the determined address.

9. A method including:

receiving, into a cache server, from a client, a current request for content from a content server, wherein the current request for the content includes one or more of the attributes from a list that includes identification of the client, identification of a session between the client and the content server and identification of a user of the client;

mapping the current request for the content into a new request for content that is without the one or more attributes, wherein mapping of the current request:

is based on mapping of one or more previous requests, and comprising inserting a field derived from the one or more previous requests into the current request, wherein the one or more previous requests includes at least one previous request for the same content; and performing a lookup into a cache list of the cache server based on the new request for content;

wherein inserting a field derived from the one or more previous requests includes:

removing one or more attributes from the current request for content if the attribute contains identification of the client, identification of a session between the client and the content server, or identification of a user of the client;

decoding an encoded string includes as one of the one or more attributes included in the current request; and creating the field based on at least a portion of the decoded string.

10. The method of claim 9, wherein mapping the current request based on mapping of one or more previous requests includes mapping the current request using identification of the session between the client and the content server derived from the one or more previous requests.

11. The method of claim 9, wherein mapping the current request based on mapping of one or more previous requests includes mapping the current request using identification of the client derived from the one or more previous requests.

12. The method of claim 9, wherein mapping the current request based on mapping of one or more previous requests includes mapping the current request using identification of a version of the content derived from the one or more previous requests.

13. The method of claim 9, further including retrieving the content from a machine-readable medium in the cache server if the content is stored in the machine-readable medium in the cache server based on the new request for content.

14. The method of claim 13, further including forwarding the content to the client if the content is stored in the machine-readable medium in the cache server based on the new request for content.

15. The method of claim 13, further including: performing the following operations if the content is not stored in the machine-readable medium in the cache server:

forwarding the new request for the content to the content server;

receiving the content from the content server;

storing a copy of the content in the machine-readable medium in the cache server; and forwarding the content to the client.

16. A system including:

a cache server coupled between a client and a content server, the cache server including:

a mapping engine to:

receive, from the client, a request for content stored in the content server;

remove from the request any field from a list of fields that includes identification of the client, identification of a session between the client and the content server, and identification of a user of the client;

generate a modified request that includes a replacement field derived from a history of requests, wherein the history of requests includes at least one previous request for the same content; and add an address of a location of the content to the modified request;

a data store to store content requests from the client and retrieved from the content server; and a lookup engine to determine whether the content is stored in the data store based on the modified request;

wherein deriving a replacement field from a history of requests includes:

removing one or more fields from the request for content if the field contains identification of the client, identification of a session between the client and the content server, or identification of a user of the client;

decoding an encoded string includes as one of the one or more fields included in the request ; and creating the replacement field based on at least a portion of the decoded string.

17. The system of claim 16, wherein the mapping engine is to generate the modified request based on identification of the session between the client and the content server derived from the one or more previous requests.

18. The system of claim 16, wherein the mapping engine is to generate the modified request based on identification of the client derived from the one or more previous requests.

19. The system of claim 16, wherein the mapping engine is to generate the modified request based on identification of a version of the content derived from the one or more previous requests.

20. An apparatus comprising a computer, the apparatus including:

means for receiving, into a cache server, from a client, a request for content from a content server, wherein the request for content includes one or more fields;

means for mapping the request for content into a new request for content that is without the one or more fields, wherein the means for mapping of the request includes:

means for deriving a field from a history of requests, wherein the history of requests include at least one previous request for the same content; and means for inserting the field into the request; and means for performing a lookup into a cache list of the cache server based on the new request for content;
wherein the means for deriving a field from a history of requests includes:
means for removing one or more fields from the request for content if the field contains identification of the client, identification of a session between the client and the content server, or identification of a user of the client;
means for decoding an encoded string included as one of the one or more fields included in the request; and
means for creating the field based on at least a portion of the decoded string.

21. The apparatus of claim 20, further including means for retrieving the content from a machine-readable medium in the cache server if the content is stored in the machine-readable medium in the cache server based on the new request for content.

22. The apparatus of claim 21, further including means for forwarding the content to the client if the content is stored in the machine-readable medium in the cache server based on the new request for content.

23. The apparatus of claim 20, wherein the one or more fields include attributes from a list that includes identification of the client, identification of a session between the client and the content server and identification of a user of the client.

24. An apparatus comprising a computer, the apparatus including:
means for receiving, into a cache server, from a client, a current request for content from a content server, wherein the current request for content includes one or more of the attributes from a list that includes identification of the client, identification of a session between the client and the content server and identification of a user of the client;
means for mapping the current request for the content into a new request for the content that is without the one or more attributes, wherein the means for mapping of the current request:
is based on mapping of one or more previous requests, and
comprising means for inserting a field derived from the one or more previous requests into the current request, wherein the one or more previous requests includes at least one previous request for the same content; and
means for performing a lookup into a cache list of the cache server based on the new request for the content;
wherein means for inserting a field derived from the one or more previous requests includes:
means for removing one or more attributes from the current request for content if the attribute contains identification of the client, identification of a session between the client and the content server, or identification of a user of the client;
means for decoding an encoded string included as one of the one or more attributes included in the current request; and
means for creating the field based on at least a portion of the decoded string.

25. The apparatus of claim 24, wherein means for mapping the current request based on mapping of one or more previous requests includes means for mapping the current request using identification of the session between the client and the content server derived from the one or more previous requests.

26. The apparatus of claim 24, further including means for retrieving the content from a machine-readable medium in the cache server if the content is stored in the machine-readable medium in the cache server based on the new request for content.

27. The apparatus of claim 26, further including means for forwarding the content to the client if the content is stored in the machine-readable medium in the cache server based on the new request for content.

28. A computer-readable storage medium storing computer program instructions which, when executed by one or more processors, cause the one or more processors to perform a method comprising:
receiving, into a cache server, from a client, a request for content from a content server, wherein the request for content includes one or more fields;
mapping the request for the content into a new request for the content that is without the one or more fields, wherein the mapping of the request includes:
deriving a field from a history of requests, wherein the history of requests includes at least one previous request for the same content; and
inserting the field into the request; and
performing a lookup into a cache list of the cache server based on the new request for the content;
wherein deriving a field from a history of requests includes:
removing one or more fields from the request for content if the field contains identification of the client, identification of a session between the client and the content server, or identification of a user of the client;
decoding an encoded string included as one of the one or more fields included in the request; and
creating the field based on at least a portion of the decoded string.

29. A computer-readable storage medium storing computer program instructions which, when executed by one or more processors, cause the one or more processors to perform a method comprising:
receiving, into a cache server, from a client, a current request for content from a content server, wherein the current request for content includes one or more of the attributes from a list that includes identification of the client, identification of a session between the client and the content server and identification of a user of the client;
mapping the current request for the content into a new request for the content that is without the one or more attributes, wherein the mapping of the current request:
is based on mapping of one or more previous requests, and
comprises inserting a field derived from the one or more previous requests into the current request, wherein the one or more previous requests includes at least one previous request for the same content; and
performing a lookup into a cache list of the cache server based on the new request for the content;
wherein inserting a field derived from the one or more previous requests includes:
removing one or more attributes from the current request for content if the attribute contains identification of the client, identification of a session between the client and the content server, or identification of a user of the client;
decoding an encoded string included as one of the one or more attributes included in the current request; and
creating the field based on at least a portion of the decoded string.

* * * * *

UNITED STATES PATENT AND TRADEMARK OFFICE
CERTIFICATE OF CORRECTION

| | | |
|---|---|---|
| PATENT NO. | : 7,640,296 B2 | Page 1 of 1 |
| APPLICATION NO. | : 11/019607 | |
| DATED | : December 29, 2009 | |
| INVENTOR(S) | : Fuchs et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1028 days.

Signed and Sealed this

Twenty-first Day of December, 2010

David J. Kappos
*Director of the United States Patent and Trademark Office*